United States Patent

[11] 3,628,730

[72] Inventor  Warren B. Nelson
               Route #2, Meridian, Idaho 83642
[21] Appl. No. 79
[22] Filed     Jan. 2, 1970
[45] Patented  Dec. 21, 1971

[54] APPARATUS AND METHOD FOR IRRIGATION
     17 Claims, 33 Drawing Figs.
[52] U.S. Cl. .................................................. 239/189,
                                              137/344, 239/11
[51] Int. Cl. .................................................... B05b 3/02
[50] Field of Search ........................................... 239/188,
                                       189, 190, 212, 11; 137/344

[56]                References Cited
                 UNITED STATES PATENTS
1,714,713   5/1929   Farley ............................ 239/189
2,493,528   1/1950   Crowder ......................... 239/189
3,009,646  11/1961   Purtell ............................ 239/189
3,043,520   7/1962   Nelson ........................... 239/189
3,220,654  11/1965   Purtell ............................ 239/212

Primary Examiner—M. Henson Wood, Jr.
Assistant Examiner—Michael Y. Mar
Attorney—John W. Kraft ABSTRACT: The present apparatus comprises a frame carrying an accumulating reel having a ratchet distally mounted about the periphery of the reel, a crank having a pawl engageable with the ratchet and means operable to reciprocally drive the crank to drive the reel in one direction. In the embodiments specified the reel may accumulate flexible conduit thereon by moving over the conduit, or alternatively to accumulate conduit or cable upon the reel while the reel is stationary.

The method of irrigating tracts of land comprising the steps of
  placing a mechanical sprinkler in a field to be irrigated, said sprinkler having a nozzle orifice operable to distribute water at a splash down rate below the predetermined rate of compaction of a selected soil;

supplying a volume of water under pressure through a conduit connected to a water source to said mechanical sprinkler at a rate equal to the predetermined field-absorption rate of a selected soil;

substantially continuously moving said sprinkler at a rate to apply a volume of water to the field below the predetermined field capacity of a selected soil;

repeating the above steps at intervals equal to the change of predetermined reservoir capacity of a selected soil at the lowest terminal end of the root zone of crops in said field.

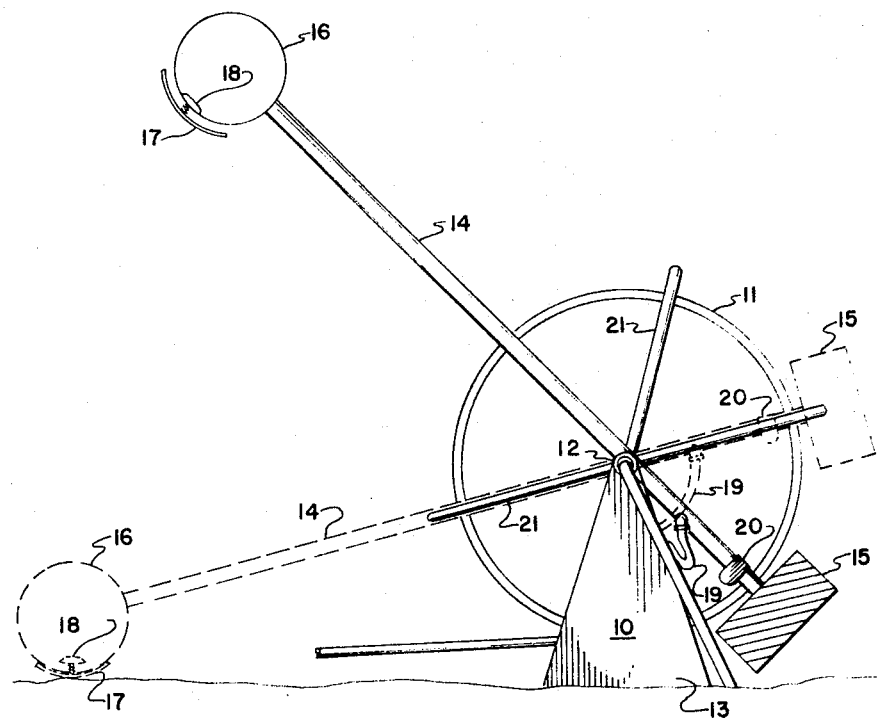
FIG. I

WARREN B. NELSON INVENTOR.

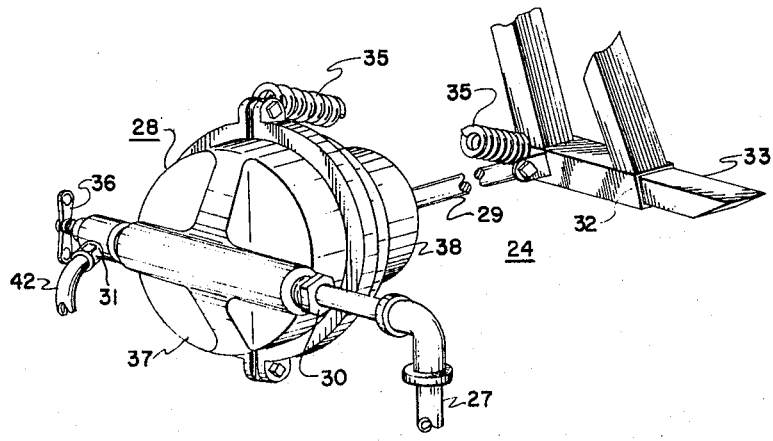
FIG. 4
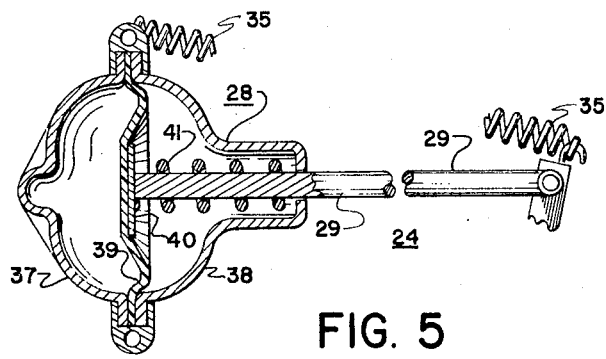
FIG. 5
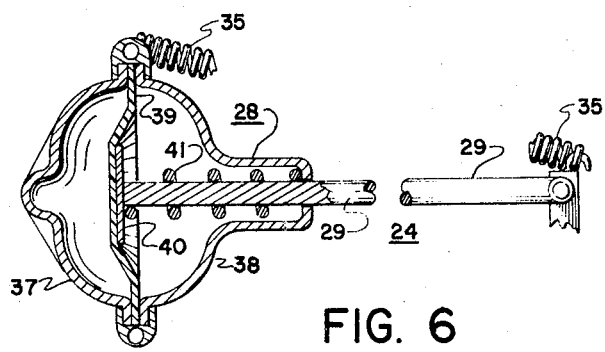
FIG. 6
WARREN B. NELSON  INVENTOR.

WARREN B. NELSON INVENTOR.

WARREN B. NELSON INVENTOR.

WARREN B. NELSON  INVENTOR.

WARREN B. NELSON  INVENTOR.

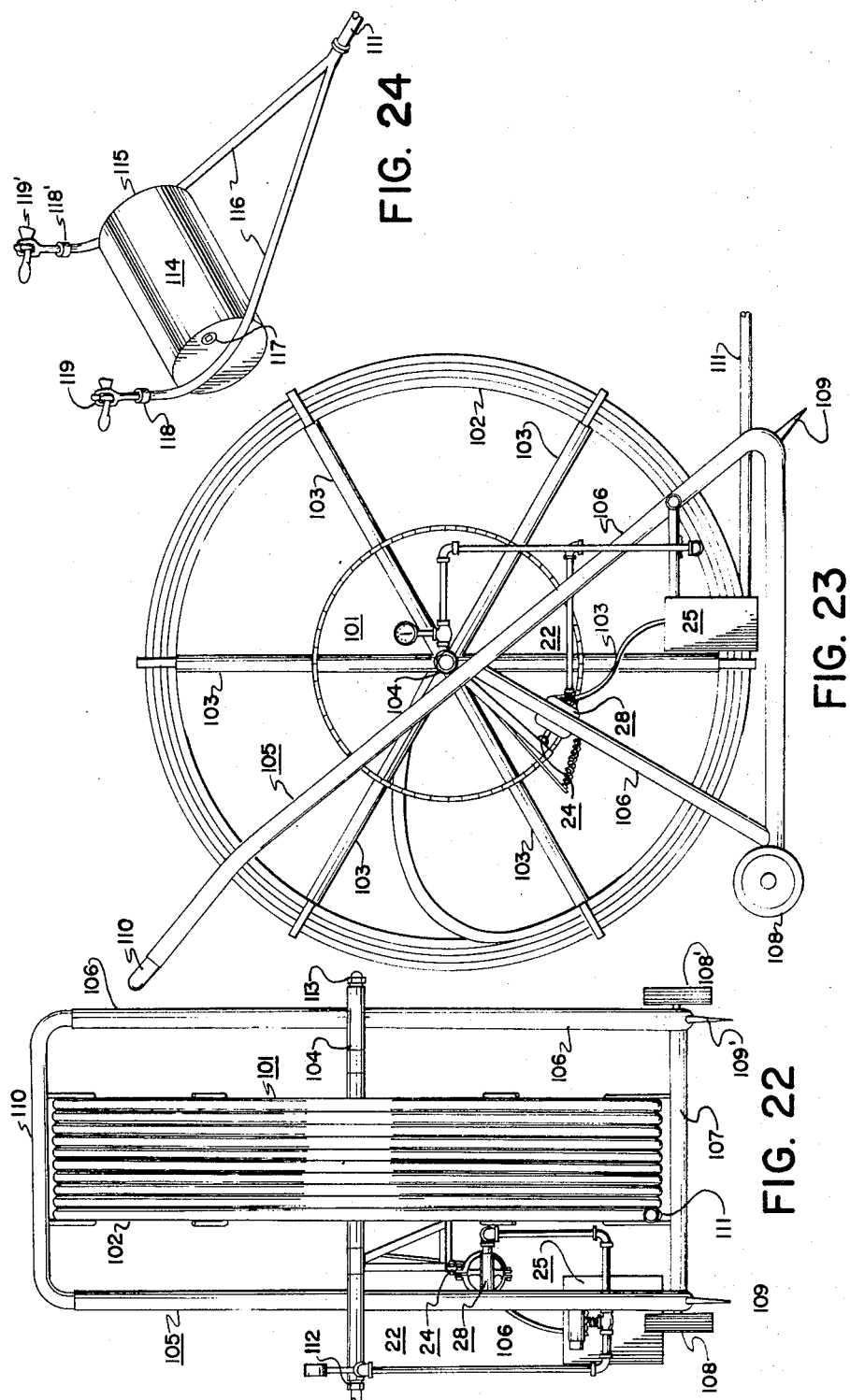

| OVERLAP FREQUENCY | LEGEND | APP. RATE PER HOUR |
|---|---|---|
| 1 |  | .053" |
| 2 |  | .106" |
| 3 |  | .159" |
| 4 |  | .212" |

WARREN B. NELSON INVENTOR.

BY

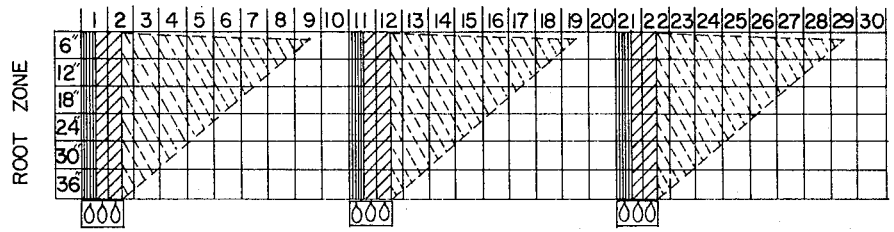
FIG. 31
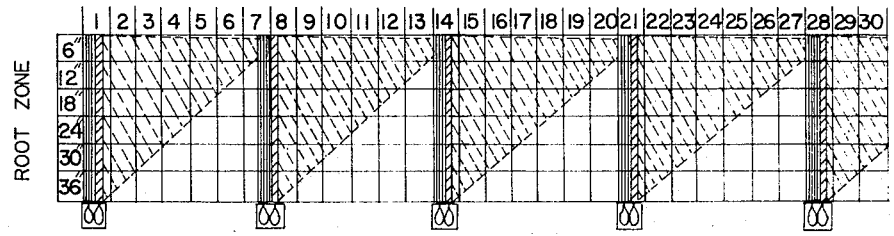
FIG. 32
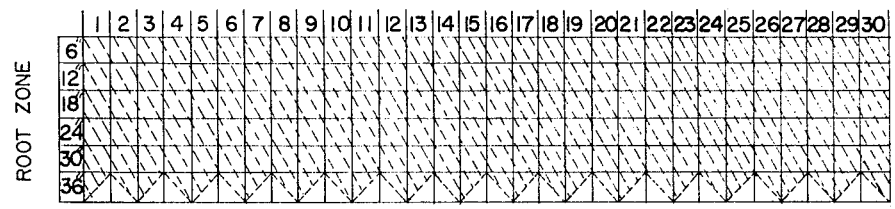
FIG. 33
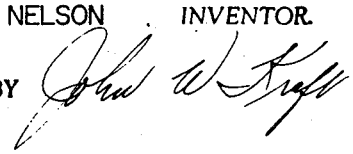

APPARATUS AND METHOD FOR IRRIGATION

FIELD OF THE INVENTION

The present invention relates to apparatus and method for irrigating large tracts of agricultural land and more particularly to irrigation apparatus and method which includes substantially continuously moving mechanical sprinklers across a field to be irrigated and a method for determining optimum quantities of water to be applied in each pass of the apparatus in a given irrigating cycle.

DESCRIPTION OF THE PRIOR ART

Large agricultural tracts of land are generally irrigated at predetermined intervals by providing a multiplicity of parallel ditches between the rows of growing crops; by providing a plurality of fixed parallel pipelines having a multiplicity of mechanical sprinkler apparatus fixed thereto the pipelines and the mechanical sprinkler apparatus on each of the pipelines being spaced apart at intervals so that water distributed by each of the mechanical sprinkler apparatus falls upon the ground in overlapping patterns; or by periodically moving at predetermined intervals and at predetermined distances a single pipeline having a multiplicity of mechanical sprinkler apparatus connected to the pipeline and spaced apart at intervals on the pipeline so that water distributed by each of the mechanical sprinkler apparatus falls upon the ground in an overlapping pattern. Many schemes have been advanced to decrease requirements of attendant labor in each of the methods above set out, including electromechanical apparatus operative to automatically cause changes in the nature and character of operation of the systems periodically. However, the correlation between such factors as water application effects upon the soil, soil chemistry and physical structures of soils, and inherent soil mechanics has largely been neglected in the prior art.

For example, soil compaction occurring from repeated applications of water during a growing season has been acknowledged as a problem inherent in applying water to arid lands. Similarly excessive amounts of water draining through a soil structure tending to carry with it silts and fines which have substantial quantities of minerals necessary for plant nourishment is an area of the art and science of irrigation that has heretofore not been specifically related to the method and apparatus use in applying water to agricultural tracts. Further, water-soil particle tension characteristics which are largely responsible for the drowning of plant life has received little or no attention, except for very recent experimentation in the industry designated "Aeration Irrigation" by those skilled in the art. Principally this method of mechanical sprinkler apparatus application is based on very low application rates, usually approximately one-half of the normal intake rate of a given soil, and requires very special attention be given to adequate water pressures at the nozzle. Methods and apparatus used in "Aeration Irrigation" generally requires twice as many laterals per given acre with the frequency of "set" moves to exist at least twice as long as was formerly considered "normal" in the prior art. That is to say that irrigation apparatus must remain in one location approximately twice as long as apparatus formerly used and must be a size of approximately one-half that of former selection to apply a lesser quantity of water to the field to be irrigated. Although twice as much apparatus must be used it need only be changed half as many times which results in no appreciable change in labor requirement. However, experimentation with reference to this type of irrigation has been arbitrary.

Accordingly, it is a principle object of the present invention to provide a method of irrigating large tracts of land employing apparatus which may be correlated to the particular soil characteristics.

It is a further object of the present invention to provide means by which soil characteristics and irrigating effects may be more accurately determined.

Another object of the present invention is to provide means by which mechanical sprinkler apparatus may be substantially continuously moved over a field to distribute water upon that field in such a manner as to overcome the dilatorious affects of mechanical sprinkler apparatus presently known in the art.

Generally, the methods of the present invention includes the steps of (1) calculating the "field capacity-saturation volume" of a preselected soil sample by placing the sample into a container having porous screened bottom operative to permit water to flow therethrough, and, at the same time, retain the soil sample, pouring water into the container, and, consequently, the soil sample until the water appears to reverse its direction of flow at the bottom of the soil sample by a flooded collection of water or until water appears to collect at the surface without penetrating the soil sample, and then measuring the volume of water thus poured, (2) determining the "field rate" of a preselected soil sample by placing the soil sample into containers having a porous screened bottom operative to permit water to flow therethrough, while retaining the sample, pouring water into the container and the sample until the bottommost portion of the sample is wetted, measuring the elapsed time for the sample to become wetted; (3) calculating the "field reservoir capacity" of a selected soil sample by placing a multiplicity of samples into containers and wetting the samples to "field capacity-saturation volume," weighing each of the samples, selecting one of the respective samples at periodic intervals, baking the respective sample to remove remaining moisture, and weighing the sample, thus determining the amount of moisture retained in the soil at periodic intervals; (4) determining a selected "plant withdrawal rate" and the soil-water tension from graphs and charts now commonly known; and (5) determining the average rate of ambient evaporation for various periods of time during the growing season from historical data published by the U.S. Weather Bureau. Although each particular tract of land has unique soil characteristics, it has been found that soils may be generally classified into marginally similar groups. In practice, precalculated charts for each soil and each plant classification showing "field capacity-saturation volume," "field rate," "field reservoir capacity," "plant withdrawal rate," and the "rate of ambient evaporation" may be made by accumulating test data together. The volume of water required for growing crops at the rate at which a selected soil will accept that water provides information necessary in selecting irrigating apparatus and equipment. That is to say the nozzle size, the water pressure and size of conduits necessary to distribute the volume of water at a determined rate may be selected. The frequency or intervals at which irrigation may be performed is determined by adding together the volume of water required by a particular crop, and the total volume of water and subtracting the sum from the reservoir capacity of a selected field. Hence, the method of irrigation taught by the present invention includes the steps of (1) apply a volume of water equal in amount of "field capacity" of a selected soil and at a rate commensurate with the "field rate" of acceptance of that soil without saturation, and (2) apply the water at intervals sufficient to maintain the soil reservoir at a uniform level to continuously "feed" a growing crop after deducting the withdrawal rate of that crop, and the amount of water exhausted by evaporation from the average "reservoir capacity." It has been found in practice that water to crops is most beneficial when only the micropours or interstices of a soil particle are full of water while the macropours comprise a gas or an air bubble so that water may flow through the particle, since the water tends to become trapped and does not flow, the particle acting in a manner analogous to a conduit not having a venting means. Therefore, it has been found to advantage to adjust the "field rate" or rate at which water is applied to the soil by the volume of water in or remaining in the soil by its reservoir. A practical and economical method taught by this invention is to substantially continuously apply volume of water to a tract or field to be irrigated by traversing the field and then returning in the same path across the field, applying the total volume at a predetermined rate in a plurality of oscillating passes.

Suitable apparatus operable to cause movement in the methods of irrigation hereinabove described may comprise an accumulating reel driven by a crank and axle-type mechanism. Typical of such mechanisms is an apparatus comprising an accumulating reel journaled for rotation on an axle carried by a pair of pedestal mounting frame, a lever arm disposed between the reel and the pedestal and journaled for pivotal movement on the axle, a counterweight at one terminal end of the level arm, a reservoir at the opposite terminal end of the arm including a spring-loaded relief valve operable to discharge water from the reservoir when the valve closure is moved inwardly into the reservoir in response to external pressure exerted against the valve, a flexible water supply line from any suitable source connected to the lever arm to provide water through the arm and into the reservoir, and a spring-loaded racketlike dog assembly operable to engage the spokes of the reel. In operation water from the line flows through the lever arm and into the reservoir where the water is accumulated to overcome the counterweight and is thereby caused to move downwardly toward the ground from its normally raised position and to cause the counterweight at the opposite terminal end of the lever arm to be moved upwardly. The dog assembly in engagement with one of the spokes causes the reel to be rotationally advanced. In this manner sprinkler apparatus connected to the wheel is caused to substantially continuously move.

It is to be understood that the driving means above described may be connected to any of a variety of types of accumulating reels which may accumulate either flexible conduits such as pipes or cables and the like. It will become apparent from the description following that the lever arm mechanism may be "cranked" by the vertical movement of a reservoir attached to the arm by suitable means in which the reservoir does not form an integral part of the arm. A more comprehensive and thorough understanding may be had from the detailed description following when read in connection with the drawings herein:

FIG. 1 is a side elevational view of a crank and axle-type mechanism of the present invention shown in the environment of an accumulating reel operable to accumulate flexible conduit;

FIG. 4 is a perspective view of the drive crank assembly of the present invention;

FIG. 5 is a cross section elevational view of a water drive diaphragm valve of the present invention showing the shaft thereof in its extended position;

FIG. 6 is a cross section elevational view of the diaphragm valve of FIG. 5 with the shaft thereof in its retracted position;

FIG. 22 is a front elevational view of the present invention shown in the environment of a fixed flexible conduit-accumulating reel apparatus;

FIG. 23 is a side elevational view of the apparatus of FIG. 22;

FIG. 24 is a mechanical sprinkler travelling means intended to be used in combination of the apparatus shown in FIGS. 22 and 23 and with flexible conduit which is intended to be accumulated upon a reel;

FIG. 31 is a chart representing the soil capacity and reservoir for each day between irrigating cycles in a field irrigated by the "flood ditch" method;

FIG. 32 is a comparative chart similar to FIG. 31 showing the same field irrigated by mechanical sprinklers arranged in overlapping patterns and irrigated by methods presently used in the art;

Figure 3:
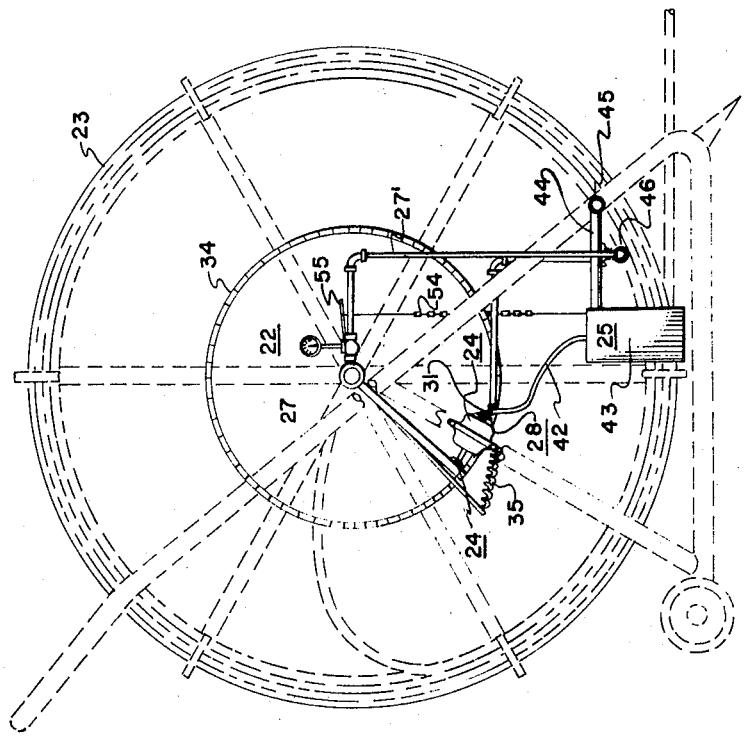
FIG. 3 is a side elevational view of the apparatus shown in FIG. 2.

FIG. 33 of a comparative chart showing the typical pattern of irrigation as done in accordance with the teachings of the present invention.

DETAILED DESCRIPTION OF THE PREFERRED EMBODIMENT

Generic Apparatus

Suitable apparatus operable to cause movement in the systems and methods of irrigation herein later described may comprise an accumulating reel driven by a crank- and axle-type mechanism. Typical of such mechanisms is the apparatus 10 shown to advantage in FIG. 1 which comprises an accumulating reel 11 journaled for rotation on an axle 12 carried by a pair of pedestal mounting frames 13 and 13'; a lever arm 14 disposed between the reel 11 and the pedestal 13 and journaled for pivotal movement on the axle 12; a counterweight 15 at one terminal end of lever arm 14; a water reservoir 16 at the opposite terminal end of arm 14 including a spring-loaded relief valve 17 operable to discharge water from the reservoir 16 when the valve closure 18 is moved inwardly into the reservoir 16 in response to external pressure exerted against the valve 17; a flexible water supply line 19 from any suitable source connected to lever arm 14 to provide water through the arm 14 and into the reservoir 16; and a spring loaded ratchetlike dog assembly 20 operable to engage the spokes 21 of reel 11. In operation, water from line 19 flows through the lever arm 14 and into the reservoir 16. When sufficient water is accumulated in the reservoir 16 to overcome the weight of the counterweight 15, the reservoir 16 is caused to move downwardly toward the ground from its normally raised position, and to cause the counterweight 15 at the opposite terminal end of lever arm 14 to be moved upwardly as shown in dotted lines. The dog assembly 20 in engagement with a spoke 21 causes the reel 11 to be rotationally advanced. When the reservoir 16 rests upon the ground, the valve closure 18 is caused to be moved inwardly into the reservoir by the weight of the water in the reservoir 16 against the ground which causes a pressure to be exerted on the valve 17 disposed between the reservoir 16 and the ground. Consequently, water is caused to be discharged from the reservoir 16 and the reservoir is caused to return to its normally raised position when empty by counterweight 15. The dog assembly 20 is permitted to ride over the next succeeding spoke 21 of the reel 11 as the reservoir 16 and lever arm 14 return to their normal position. When the reservoir 16 and arm 14 are in their normal position, the dog of assembly 20 is caused to be extended by a spring in the assembly 20. Hence the dog assembly may engage the next succeeding spoke 21 for another cyclical movement of reel 11.

Species I of Preferred Apparatus

Mechanically equivalent to the apparatus above described is the preferred embodiment of driving apparatus hereinafter set out which has been found more easily adapted to the several species of the invention.

Figure 2:
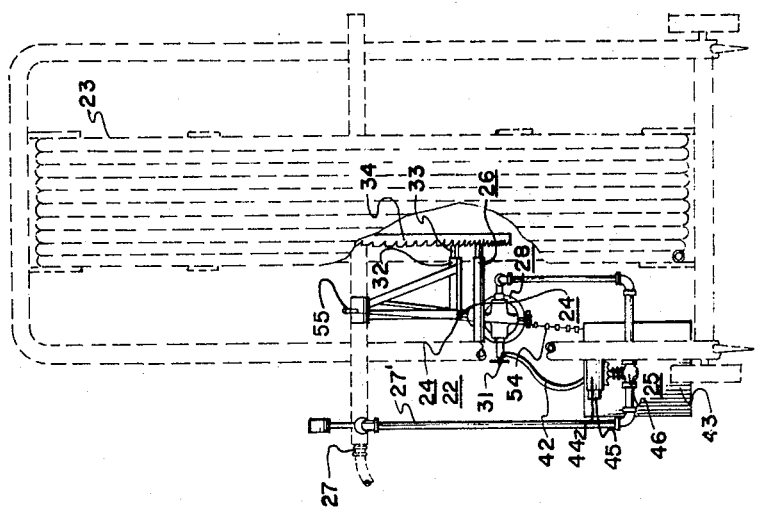
FIG. 2 is a front elevational view of a modified crank and axle mechanism operable to drive an accumulating reel which is shown in dotted lines for illustrative purposes.

Referring now to FIGS. 2 and 3, the driving mechanism generally designated by the numeral 22 may be connected to an accumulating reel 23 shown in dotted lines. It is to be understood that mechanism 22 may be connected to any of a variety of types of accumulating reels including the several species of systems herein later described which are operable in connection with the methods of irrigation disclosed. The driving mechanism 22 may be divided into three distinct operating assemblies for convenience, namely a drive crank assembly 24, a time-rate sequence assembly 25, and a stabilizing stop assembly 26 which may be more clearly seen in FIG. 2. Supply water from a suitable source may be connected to the accumulating reel such as shown generally at 27 to furnish water to irrigate in fields as hereinafter described. A secondary water line 27' may be connected to the primary irrigation supply water line to provide power for operating drive crank assembly 24.

Referring now to FIGS. 4, 5, 6, and 7, the drive crank assembly 24 comprises a water driven diaphragm valve 28 having a driven shaft 29, a water inlet portion 30 and a water bleeder outlet portion 31; (a crank arm assembly 32 including a spring loaded ratchetlike dog assembly 33 engageable with a circular rack 34 suitably fixed to accumulating reel 23); and a retaining bleeder spring 35 disposed between crank arm assembly 32 and the valve 28. One end of crank arm assembly is journaled for rotation on the axle of the accumulating reel 23 of the mechanism 22. Assembly 32 and rack 34 are shown to advantage in FIG. 10. Water bleeder portion 31 is provided with a shutoff valve 36 by which the rate of discharge of water from the diaphragm valve 28 may be controlled. The diaphragm valve 28 is similar to diaphragm type air valves used in airbrake assemblies in motor trucks, except that the valve 28 includes the bleeder outlet portion 31. The diaphragm valve 28 includes a mating housing portions 37 and 38, a flexible diaphragm 39 carried between housing portions 37 and 38, a driving plate 40 suitably fixed to one terminal end of driven shaft 29 and disposed in housing portion 38 against the diaphragm 39 and being in communication therewith, and a retaining spring 41 carried on the shaft 29 and disposed between the driving plate 40 and one of the walls of housing portion 38 through which the shaft 29 passes. The valve shown to advantage in FIG. 6 shows the shaft 29 extended when pressure is exerted against the diaphragm 39, while FIG. 5 shows the shaft 29 and diaphragm 39 in their respective normal retracted positions when there is no pressure in housing portion 37. It has been found in practice that less than (20) pounds per square inch of water pressure is sufficient to drive crank arm assembly 32 and consequently the circular rack 34 and an 8-foot diameter accumulating reel having 500 lineal feet of 1-inch diameter flexible pipe thereon. Suffice it to say that only nominal pressures are required in the driving assembly arrangement here disclosed to accomplish the work intended. The driving assembly 28 is oriented on the frame of the accumulating reel so that the dog 33 engages the rack 34, and the rack and, consequently, the accumulating reel 23 are caused to be articulated about the axle of the reel 23 when the shaft 29 to which the crank arm assembly 32 is fixed is extended.

A bleeder line 42 is provided on the shutoff valve 36 at the outlet 31 on diaphragm valve assembly 28. The line 42 extends and discharges water from diaphragm valve assembly 28 into the time-rate sequence assembly 25.

Figure 7:
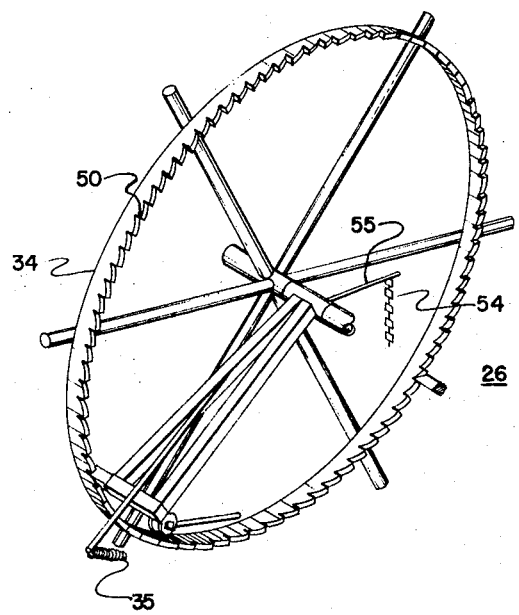
FIG. 7 is a perspective view of the ratchet dog and rack assembly of the present invention.
Figure 8:
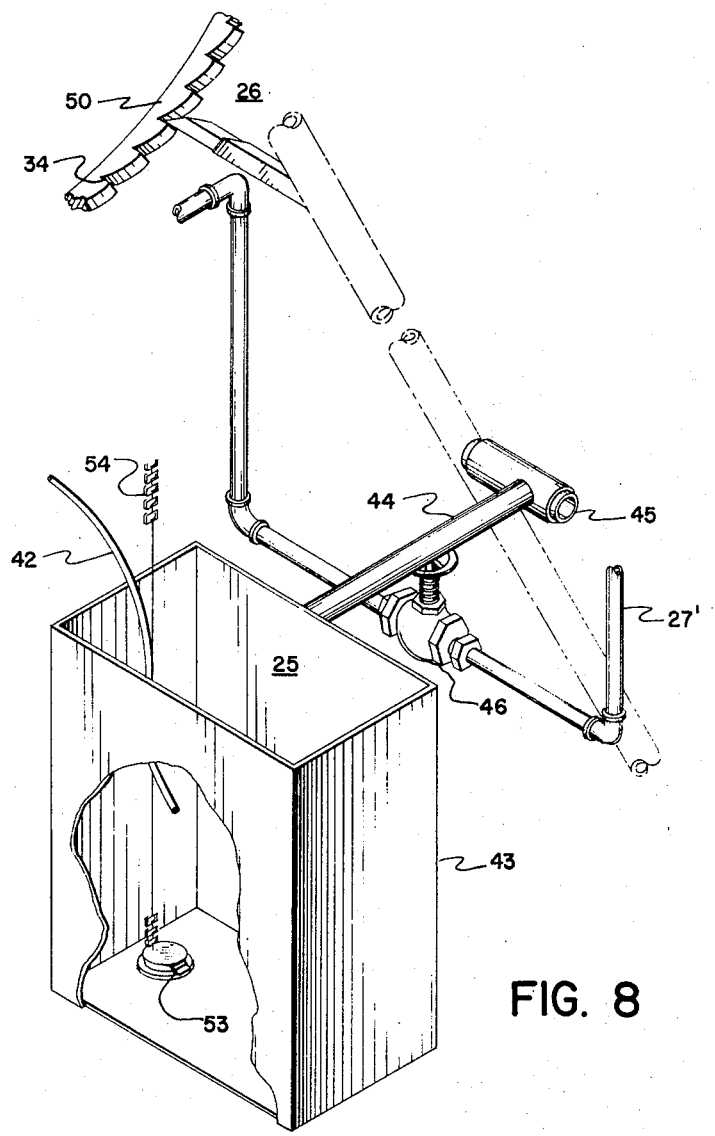
FIG. 8 is a perspective view of the time rate assembly.

The time-rate sequence assembly 25 shown to advantage in FIG. 8, includes a tank 43 carried at one of the terminal ends of a shutoff arm 44. The arm 44 is pivotally mounted at its opposite terminal end to a stud 45 suitably fastened and projects from the frame of accumulating reel 23. A commonly known globe-type water valve 46 modified to include a spring disposed on the shaft of the valve shutoff portion and having the threads of the shaft removed so that the shutoff portion may move upwardly and downwardly in response to pressure upon the shaft portion, is disposed in the secondary waterline 27 beneath the arm 44. When the tank 43 is filled with water from the diaphragm valve 24 through the bleeder line 42, the weight of the water in the tank 43 causes the tank to be articulated downwardly, forcing the arm 44 to exert a pressure on the shaft of the valve 46 to interrupt the flow of water through the line 27. The spring 35 forces the shaft 29 of the diaphragm valve 28 to move rearwardly against the diaphragm 39 of the valve 28. This in turn causes the water in housing portion 37 to be bled out of the valve 28, through the bleeder line 42 and into the tank 43. The ratchetlike dog assembly 32 shown to advantage in FIGS. 4 and 7, is caused to be moved downwardly as the shaft 29 of the diaphragm valve 28 is retracted. The driven dog portion 33 is permitted to move inwardly against a spring 49 of the dog assembly 32 and over a tooth 50 of rack 34. FIG. 8 advantageously shows the driven dog assembly 32 including the dog 33 and the spring 49. An outwardly projecting locking lug 51 is provided in the assembly 32 and is operable to be moved in a slotlike portion 52 to move the dog 33 out of engagement with rack 34.

Referring now more particularly to FIG. 8, the time-rate sequence assembly 25 is shown to advantage in a larger scale. The tank 43 is provided with a hinged float valve 53 in the bottom portion thereof similar to that used in a commonly known water closet. The float valve 53 is provided with a chain 54 having one of its terminal ends connected to the valve 53 and the terminal end opposite connected to an arm 55 on the driven stop assembly 26. The chain 54 is of a preselected length sufficient to permit the float valve 53 to be closed when the tank 43 is in its normally emptied, up position and to cause the float valve 53 to be lifted when the tank 43 is full of water and caused to be pivoted downwardly. Hence, in the down position, the water in tank 43 is caused to be discharged therefrom and the tank is permitted to pivotally move upwardly to its normally up position, and the globe valve 46 is caused to open to permit the flow of water through the line 27. Water is then again permitted to flow into the diaphragm valve 28, and the pressure in the housing portion 37 of valve 28 forces the diaphragm 39, and consequently the shaft 29 and the crank arm assembly 32 forwardly to rotatably advance the rack 34 with the accumulating reel 23 as the dog portion 33 engages a tooth 50 of the rack 34. A portion of the water in housing portion 37 is bled off through the bleeder line 42 and into tank 43 while maintaining sufficient pressure in housing portion 37 to hold the diaphragm 39 and the shaft 29 in their respective extended positions.

Figures 9, 10:
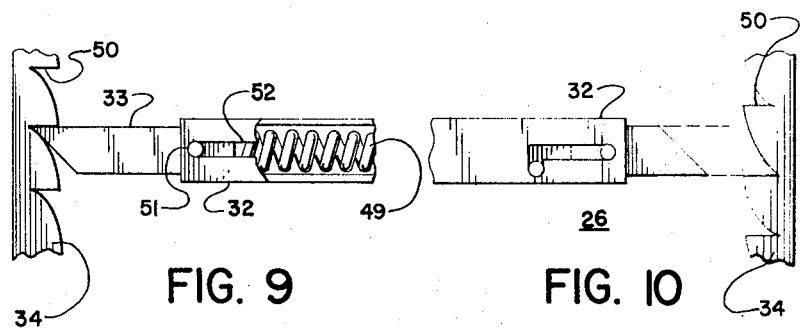
FIG. 9 is a fragmentary view of the ratchet dog drive assembly of the present invention.
FIG. 10 is a fragmentary view of the stop dog assembly shown in its retracted or disengaged position out of engagement with the rack of the present invention.

A stabilizing stop assembly 26 of the present invention shown to advantage in FIG. 9 comprises a ratchetlike dog assembly identical to dog assembly 32. The stop assembly 26 is rigidly mounted to the frame of accumulating reel 23 in a horizontal plane to the side of the rack 34 opposite the drive crank assembly 32. The dog portion of the stop assembly 26 is inversely mounted to engage with a tooth 50 of rack 34 to prevent reverse movement of the rack 34 and the accumulating reel 23 by the water hammer which may be created in the flexible pipe when the water pressure in the pipe is increased by shutting off the valve 46 in the secondary waterline 27' and at which time the dog assembly 32 of the drive crank assembly 24 is retracted. Reverse movement of rack 34 may also occur as the dog portion of crank arm 32 of the drive crank assembly 24 is moved over a tooth 50 of the rack 34. By means of stabilizing stop assembly 26, positive forward rotatable movement of rack 34 and accumulating reel 23 is assured.

It has been found in practice that a commonly known directional flow Y-type three-way valve may be connected at the terminal end of the secondary water line 27' between the water source under pressure and the line 27. The other leg of the Y-type valve may be connected to a discharge conduit. Hence, by aligning the valve opening with water source under pressure, water is conducted to the diaphragm valve 28 under pressure causing the diaphragm 39 and consequently the rod 29 to be forced outwardly. Alternatively, when the opening of the valve is aligned with side connected to the discharge conduit water is permitted to flow from the diaphragm valve. An electric directed flow, Y-type, three-way valve may be operated selectively by a pair of relays connected to commonly known timers. It is to be understood that two valves connected to the line 27' through a tee pipe connection arrangement may be sequentially operated to produce the same result. Further, the elements including the bleeder line 42 and the time-rate sequence assembly 25 is not required when using either the directed flow, Y-type, three-way valve or the two valve arrangements above described.

Species II of Preferred Apparatus

Figures 11, 12:
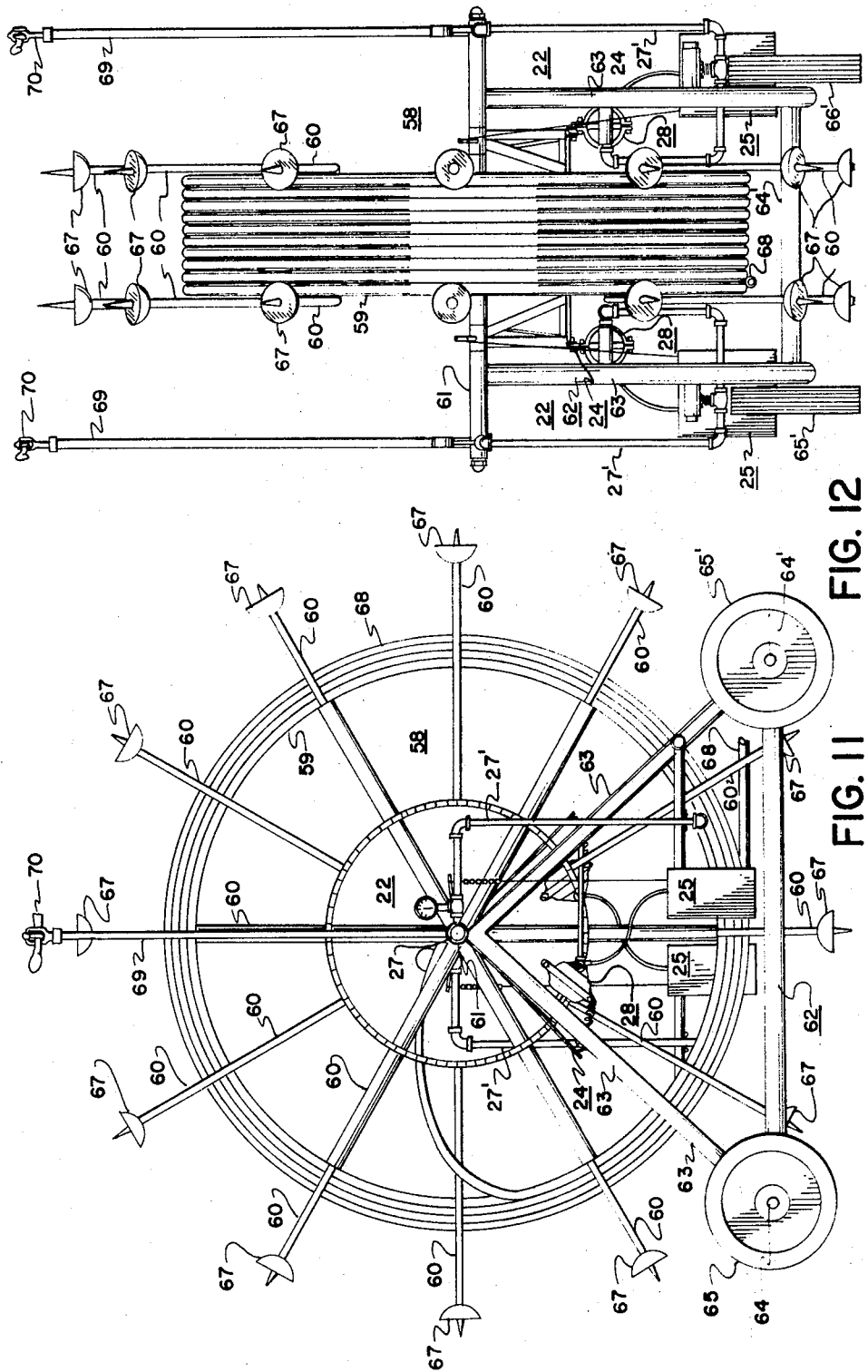
FIG. 11 is a side elevational view of further embodiment of the present invention operable to travel in either of two directions across a field to be irrigated.
FIG. 12 is a front elevational view of the apparatus of FIG. 11.

Referring now to FIGS. 11 and 12 which show to advantage an oscillating-type irrigation apparatus generally designated by the numeral 58. The apparatus 58 includes an accumulating reel 59 having a multiplicity of parallel pairs of spokes 60. The reel 59 is journaled for rotation on an axle 61 of a travelling frame 62. The travelling frame 62 comprises a pair of triangularly shaped frameworks 63 disposed at the opposite sides of accumulating reel 59, and suitably fixed to the axle 61 and to respective front and rear axles 64 and 64'. The travelling frame 62 is carried by respective front and rear pairs of wheels 65, 65' and 66, 66'. The pairs of wheels are journaled for rotation on respective front and rear axles 64 and 64' disposed between frameworks 63. Each of the parallel pairs of spokes 60 are provided with footlike members 67. The members 67 are intended to provide tractive motive force means to apparatus 58 in response to movement of the accumulating reel 59 by a driving mechanism such as 22 hereinbefore described. The apparatus 58 is provided with two driving mechanisms 22 disposed on opposite sides of accumulating reel 59 and are operable to drive the reel 59 in either of two directions in response to water pressure supplied to one or the other of the mechanisms 22. If desired an electrically operated, low-voltage multiple directional valve may be disposed in the secondary water supply line between the mechanisms 22. It is to be understood that a manually operated multidirectional valve may be substituted. The valve is operable to permit water to flow to only one of the mechanisms 22 at a time. The valve is of the type commonly known in the art including a cylinder chamber having an opening in the bottom of the cylinder which coincides with the supply entrance supply line, and an exitway opening in one side of the cylinder which permits water or gas to flow through the valve when the exitway is aligned with an outlet in the valve body. The dog assemblies 32 and 26 may be manually or mechanically disengaged in the mechanism 22 which is not operative as hereinbefore described.

A length of flexible pipe 68 is accumulated on the reel 59 and is connected at the terminal end remote from the apparatus 59 to a suitable water supply source. The opposite terminal end of the pipe 68 on the accumulating reel 59 is connected to the axle 61 which also acts as a water conduit through a commonly known ring joint (not shown). To the axle 61 are connected a pair of riser pipes 69 disposed at the opposite sides of accumulating reel 59. The riser pipes 69 each are provided with commonly known mechanical sprinklers 70 at their respective remote terminal ends. Also, connected to axle 61 is a secondary water supply line operable to supply water to a driving mechanism 22 such as that designated by the numeral 27.

In operation the apparatus 58 is caused to commence its operation near the water supply source with the flexible pipe 68 accumulated on the reel 59. One of the driving mechanisms 22 causes the apparatus 58 to be substantially continuously moved away from the water supply source while unwinding the pipe 68 from the accumulating reel 59. Concurrently, the mechanical sprinklers 70 are caused to distribute water on the field within a predetermined radius about the apparatus 58. By adjusting the respective driving mechanism 22 as hereinbefore described the rate of travel of apparatus 58, and consequently the application of water to the soil may be controlled. When the apparatus 58 reaches the limits of the pipe 68, the operating driving mechanism 22 is made inoperable by disengaging the dog assemblies 32 and 26 of the operating mechanism 22 and engaging the other mechanism 22 and in response to operation of the multiple directional valve through which the other driving mechanism 22 becomes operable to drive the apparatus 58 in the direction opposite toward the water supply and to accumulate the pipe 68 on reel 59. Therefore, the desired quantity of water may be applied to the soil commensurate with the inherent rate at which that particular soil may accent the water without the dilatorious affect upon the soil over saturation or flooding, and without the burden of additional labor costs.

It has been found in practice that the irregular contour and topography of fields to be irrigated tends to cause the upright structure of apparatus 58 to be overturned. Such environments include the irrigation of contoured side hill areas.

Species III of Preferred Embodiment

Figure 13:
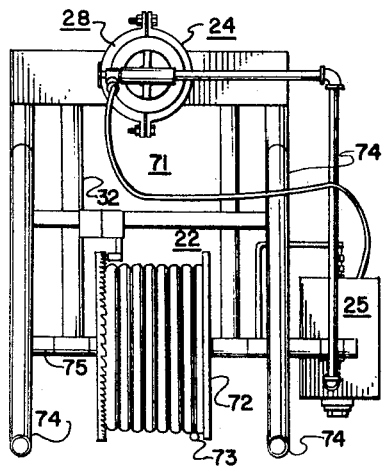
FIG. 13 is a front elevational view of a cable-accumulating apparatus and embodiment of the present invention.
Figure 14:
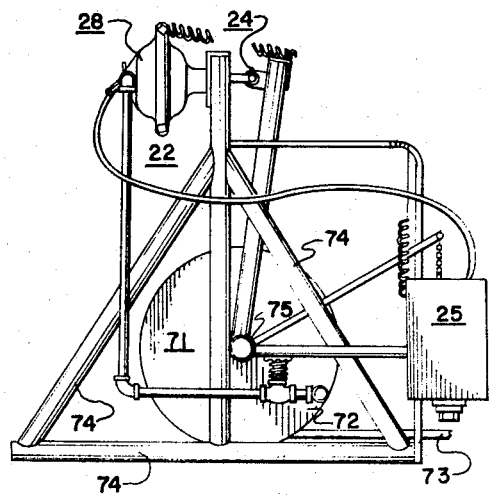
FIG. 14 is a side elevational view of the embodiment shown in FIG. 13.
Figure 15:
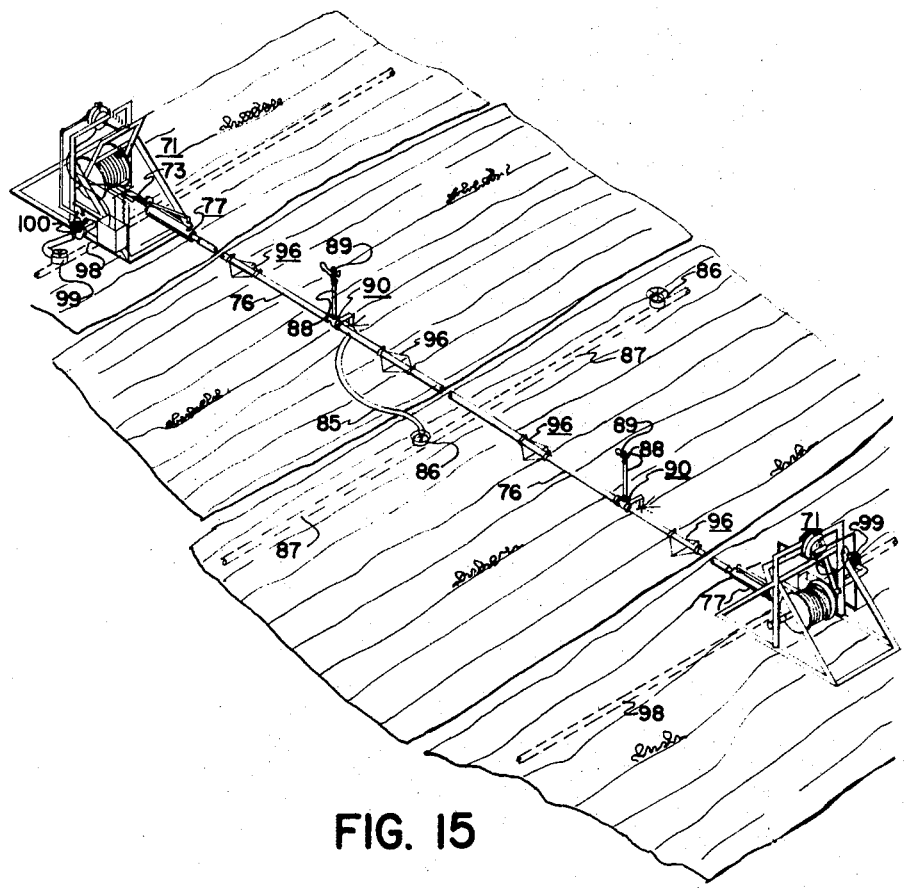
FIG. 15 is a plan view of a multiplicity of apparatus as shown in FIG. 13 in operation in a field to be irrigated.
Figure 16:
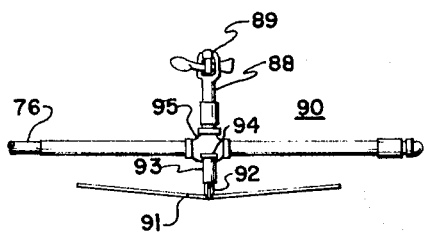
FIG. 16 is a front elevational view with travelling means taught by the present invention.
Figure 17:
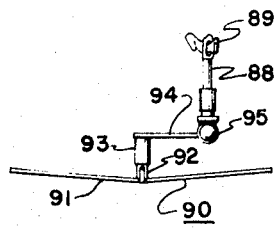
FIG. 17 is a side elevational view of the apparatus of FIG. 16.
Figure 18:
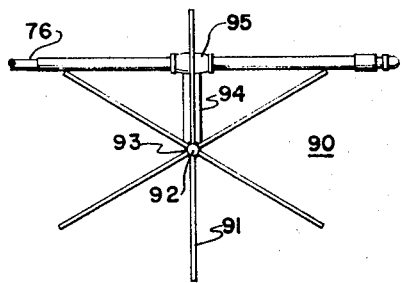
FIG. 18 is a plan view of the apparatus of FIG. 16.

In side hill environments the modified apparatus of this invention generally designated by the numeral 71 and shown to advantage in FIGS. 13, 14 and 15 has been found more desirable.

In the environment of apparatus 71 it is intended that two such apparatus be employed at opposite sides of a field to be irrigated. Therefore, the description of one such apparatus 71 shall suffice for both. The apparatus 71 is substantially the same as that hereinbefore described for apparatus 58 except that apparatus 71 is intended to remain stationary in one place and the accumulating reel designated by the numeral 72 is intended to accumulate wire, rope or cable 73 rather than flexible pipe. The accumulating reel 72 is disposed between a pair of triangularly shaped frameworks 74 and is journaled for rotation upon an axle 75 suitably fixed to the framework 74. The driving mechanism associated with apparatus 71 is substantially the same as that described hereinbefore as mechanism 22, and the parts thereof are numbered identically to those earlier set out.

Referring now more particularly to FIG. 15, the layout of a pair of apparatus 71 in the environment of operation hereinafter described is shown to advantage. At opposite sides of field to be irrigated are cable-accumulating apparatus 71 including a cable 73 suitably connected to a pipeline 76 through a cable release mechanism 77 hereinafter later described. It is to be understood that the pipeline 76 may be either a rigid or flexible pipe.

Figure 20:
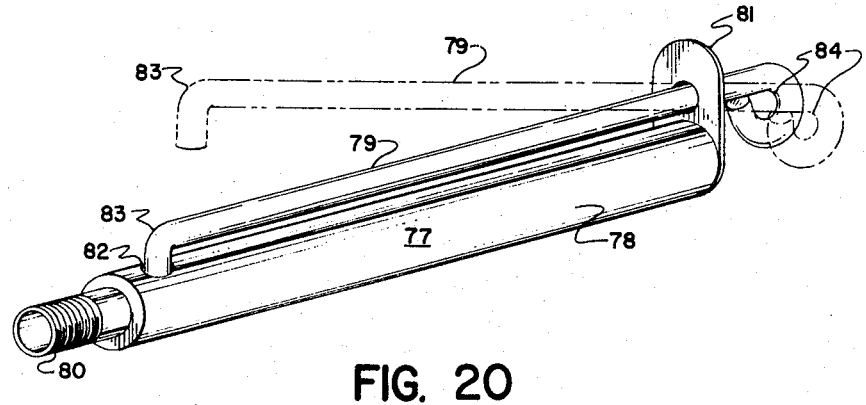
FIG. 20 is a perspective view of a release mechanism of the present invention.
Figure 21:
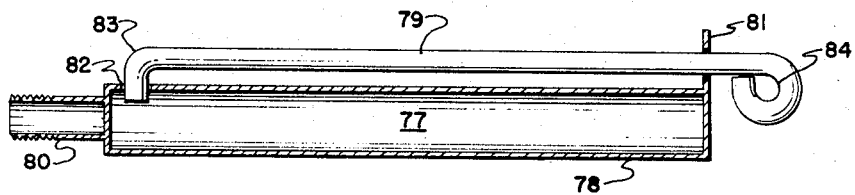
FIG. 21 is a cross-sectional elevational view of the apparatus of FIG. 20.

The cable release mechanism 77 is shown to advantage in FIGS. 20 and 21. The mechanism 77 comprises a tubular body portion 78 and a release bar portion 79. The body 78 includes a pipeline adapter portion 80 at one of its terminal ends and, a release bar retaining portion 81 at the terminal end of body 78 opposite adapter portion 80. A release bar locking-hole 82 is adapted to receive the release bar 79 in its locked position. The release bar 79 is provided with a hook portion 83 at one of its terminal ends and an eyelet portion 84 at the terminal end opposite. The release bar 79 is carried by the retaining portion 81 of the body portion 78. In operation one of the terminal ends of pipeline 76 is connected to pipeline adapter portions 80 of the mechanism 77. It will be noted in the drawings that the adapter 80 is suitably connected to an end wall position of the body 78 and as a result acts as a plug in the terminal end of pipeline 76. The cable 73 is suitably fastened to the eyelet portion 84 of the release bar 79. When an apparatus 71 is operating the hook 83 of the release bar 79 is engaged in the locking hole 82 of the body portion 78. A mechanism 77 is provided at each of the apparatus as shown in FIG. 15. To disengage a dog 33 of the drive crank assembly 32 from the rack of accumulating reel 72, the hook portion 83 of the release bar 79 may be disengaged from the hole 82 by prying, and the bar 79 will be permitted to slide rearwardly in the retaining portion 81 to release tension on the cable 73.

Figure 19:
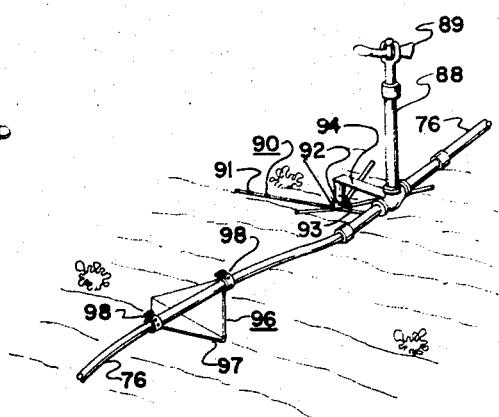
FIG. 19 is a perspective view showing the apparatus of FIG. 18 assembled to a conduit and showing the stabilizing pan of the present invention in association with the mechanical sprinkler travelling apparatus.

A flexible water supply line 85 may be suitably connected at one of its terminal ends to the pipeline 76 and at its opposite terminal end to a hydrant 86 which is in communication with a buried pipeline shown in dotted lines identified by the numeral 87. A multiplicity of pipe risers 88, including a commonly known mechanical sprinkler 89 may be disposed along the pipeline 76 at preselected points and may there be suitably connected to the pipeline 76. In practice it has been found to advantage to provide a spiderlike carrier 90 shown to advantage in FIGS. 16, 17, 18 and 19. The carrier 90 comprises a conical shape spiderlike wheel 91 horizontally disposed upon the ground, a vertically mounted stud 92; a sleeve portion 93 pivotally mounted on stud 92; an outwardly projecting arm member 94 connected at one of its terminal ends to sleeve portion 93 and at its opposite terminal end to a commonly known pipe tee 95. The pipeline 76 is connected to the tee 95 as is a riser portion 88 including the mechanical sprinkler 89. It has also been found to advantage to provide a sledlike guide member 96 to the pipeline 76 at points intermediate sprinkler carriers 90 to overcome twisting movement of the pipeline 76 as it is moved across the field. The guide 96 shown to advantage in FIG. 19 comprises a square piece of sheet metal which is cross-broken to provide a diamondlike shaped pan portion 97. The pan 97 is provided with a pair of adjustable straps 98 suitably fixed to the pan 97 and at the opposite ends of guide portion 96 connected to the pipeline 76 so that the pipeline 76 is transverse to the pan 97.

A secondary water supply line 98 may be buried at opposite sides of the field as show to advantage in FIG. 15. A conventional water valve 99 may be located at each of the apparatus 71 to which a supply line 100 may be connected to each of the operating mechanisms 22 of the respective apparatus 71. In practice, it has been found to advantage to provide one water valve 99 for each of the lines 98, and connect the mechanisms 22 of the apparatus 71 to the line 98 through a commonly known pipe tee. In this manner any number of apparatus 71 may be put on a field in systems as shown in FIG. 15 parallel to each other. In addition, in this manner all of the parallel apparatus 71 may be simultaneously controlled.

In operation, one of the cable reel apparatus 71 is made operable in response to the opening of the valve 99 associated with the operating apparatus 71. When the irrigating cycle has been completed by the accumulating of the cable 73 upon the reel 72 of the operating apparatus 71, the valve 99 on the operating apparatus 71 may be manually turned off and the accumulating reel 72 may be disengaged from the driving assembly 22 by releasing the dog 33 as earlier described. At this time the opposite apparatus 71 may be made operative in the manner as above described and the pipeline 76 may be made to be moved in the direction opposite to again irrigate the area covered by the travel of the pipe 76. Therefore, the desired quantity of water may be applied to the soil commensurate with the inherent rate at which the particular soil may accept the water without the dilatorious affect upon the soil of oversaturation or flooding, and without the burden of moving the irrigation apparatus.

Species IV of Preferred Embodiment

A further embodiment of the present invention is shown to advantage in FIGS. 22 and 23, and generally designated by the numeral 101. The apparatus 101 includes an accumulation reel 102 having a multiplicity of spokes 103. The reel 102 is journaled for rotation on an axle 104 of a movable frame 105. The movable frame 105 comprises a pair of triangularly shaped frameworks 106 disposed on opposite sides of accumulating reel 102, and suitably fixed to the axle 104 and to respective front and rear crossmembers 107. The movable frame 105 is carried by a pair of wheels 108 and 108' disposed at one of the terminal ends of the frame and by a pair of spikelike portions 109 and 109' suitably fixed to each of the frameworks 106 at the opposite end of the frame. The frameworks 106 may be joined together by a handle forming member 110. By the handle 110 the moving frame 105 may be tilted so that it may be moved from place to place on wheels 108 and 108'.

A length of flexible pipe 111 is accumulated on the reel 102 and is connected at one of its terminal ends to the axle 104 which also acts as a water conduit, through a commonly known ring joint (not shown). A commonly known hose-coupling 112 is connected to one of the terminal ends of axle 104 while the opposite terminal end of axle 104 is provided with a plug 113.

The opposite terminal end of flexible pipe 111 is connected to a travelling sprinkler such as that earlier described and designated spiderlike carrier 90 or to a travelling sprinkler apparatus such as shown to advantage in FIG. 24 and generally designated by the numeral 114.

The travelling sprinkler 114 comprises a hollow drum 115 axially disposed between a conduitlike yoke 116. The drum 115 has a plug 117 in one of its terminal ends through which water may be poured into the drum to provide ballast therefor. The terminal ends of yoke 116 are provided with couplings 118 and 118' into which commonly known mechanical sprinklers 119 and 119' may be connected. Flexible pipe 111 may be suitably fastened to the opposite terminal end of yoke 116.

The driving mechanism 22 is identical to that earlier described and the parts of the driving mechanism are numbered identically to that of the earlier description. In the present embodiment, driving mechanism 22 causes the accumulating reel 102 and the travelling sprinkler apparatus, such as that designated 114, to be substantially continuously drawn toward the apparatus 101 during an irrigation cycle.

METHOD OF IRRIGATION

Having thus described several embodiments of simple and economical structures suitable for substantially continuously driving irrigation apparatus adaptable to the methods of irrigation hereinafter set forth, the steps and principles of the methods of this invention in irrigating large tracts of land will be described following the establishment of general conditions affecting irrigated land and crops.

Figure 25:
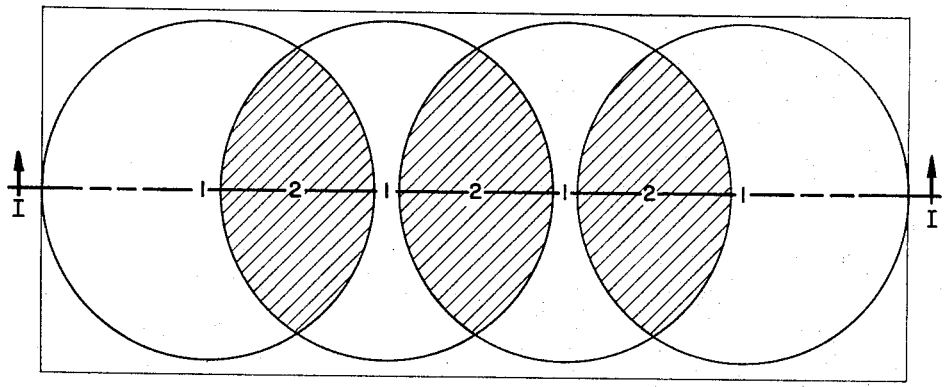
FIG. 25 is a plan view of a typical layout of mechanical sprinklers commonly used for irrigation showing to advantage the area of distribution of water therefrom.
Figure 26:
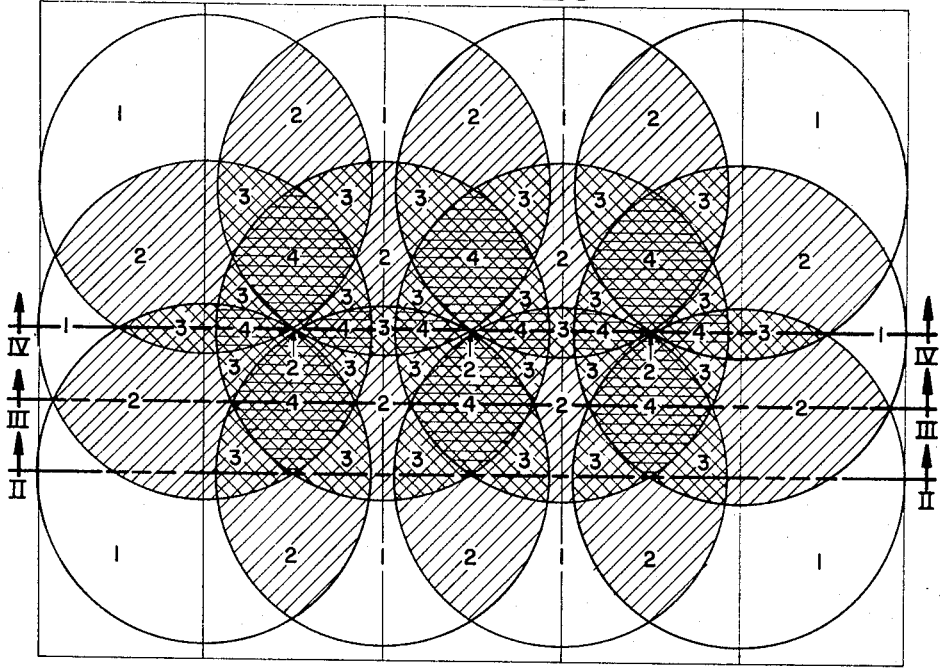
FIG. 26 is a typical resulting layer and distribution of water from commonly known sprinkler apparatus.
Figure 27:
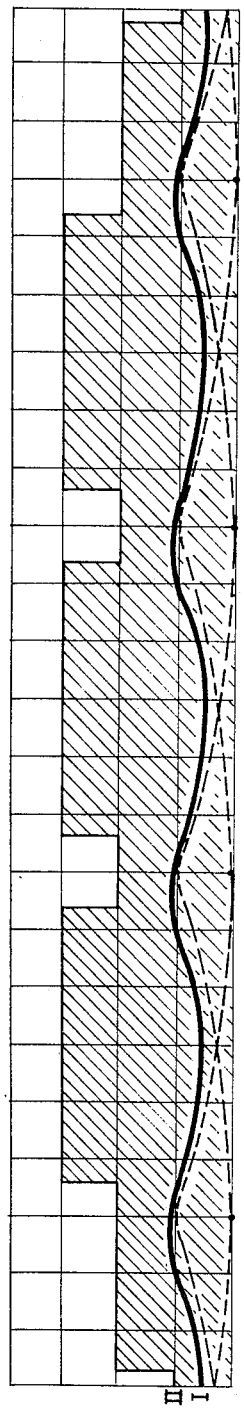
FIG. 27 is a cross-sectional profile of distribution of water taken along the lines I—I of FIG. 25 and along the line II—II of FIG. 26.
Figure 28:
FIG. 28 is a cross-sectional profile of the distribution of water taken along the line I—I of FIG. 25 and the line III—III of FIG. 26.
Figure 29:
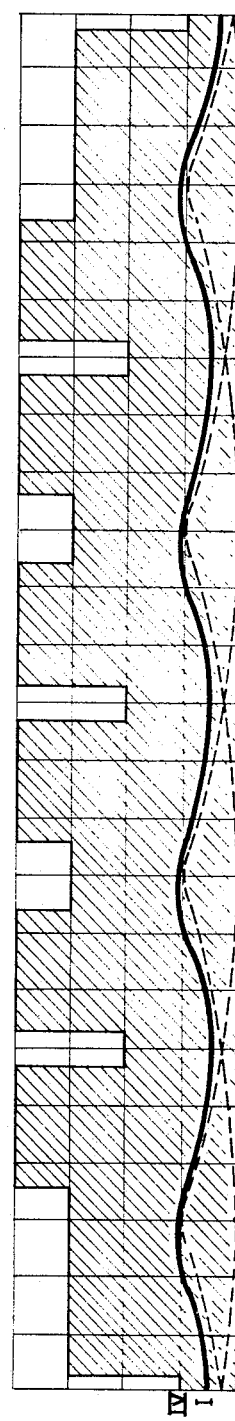
FIG. 29 is a cross-sectional profile view of the distribution of water taken along the line I—I of FIG. 25 and the line IV–IV of the FIG. 26.

Referring now to the drawings, the FIGS. 25 and 26 show to advantage a plan view of a typical layout of mechanical sprinklers commonly known in the art, while FIGS. 27, 28, and 29 show the profiles or cross sections of the "application rate" of the mechanical sprinklers as shown in FIGS. 25 and 26 taken along the lines I—I, II—II, III—III, and IV—IV. Commonly speaking, the term application "application rate" as used in the art is used interchangeably to mean the gallons of water applied per minute with respect to the area covered, and to mean the actual amount of water applied at a given instant to a particular area. In order to distinguish the respective meanings as used herein, the former meaning shall here be called "sprinkler capacity," since, in the art, the term is generally used in connection with the volume of water that may be emitted by a mechanical sprinkler in gallons per minute distributed in a definite pattern over a given radius about the sprinkler at an available water pressure at the sprinkler, while the latter meaning shall hereinafter be called the "splash-down rate" and shall refer to the actual volume of water striking the ground in a particular area as a result of overlapping patterns of mechanical sprinklers or overlapping patterns of other means of application, such as by flood-ditch irrigation. The FIGS. 27, 28 and 29 show to advantage in dotted lines the profile distribution of varying quantities of water from individual mechanical sprinklers spaced apart on 30-foot centers which is, in fact, the "sprinkler capacity" of selected mechanical sprinklers. By overlapping mechanical sprinklers as shown in the plan view of FIG. 25, a relatively uniform application may be obtained in the "spash-down rate" as shown by the solid heavy lines designated by the indicia I in the profile views of fIGs. 27, 28, and 29. However, by continuing to overlap the "sprinkler capacity" patterns by eight solid set parallel rows of mechanical sprinklers operating simultaneously, or by periodically moving a single row of mechanical sprinklers to parallel positions as required to irrigate a large field as shown to advantage in FIG. 26, the "splash-down rate" reaches as much as four times the amount of water needed or desired in some areas. This is better illustrated by the cross-hatched profiles shown and designated by the indicia II, III and IV of FIGS. 27, 28, and 29, respectively. Although not illustrated, similar patterns of "sprinkler capacity" of flooded parallel irrigation ditches in a field and the "splash-down rate" of water travelling by capillary action through the soil may obtain. In practice it has been found that there is little or no significant difference between the profiles shown for mechanical sprinklers and flood ditch irrigation; the advantage of mechanical irrigation over flood ditch irrigation being primarily that of control of the volume of water which may be applied at a given time. That is to say that in mechanical sprinkler systems less than full volume may be applied in more frequent intervals in order to correlate such factors as the soil capacity, the crop requirements and the application rate most desirable. In the illustrations of FIGS. 25 through 29 inclusive, the optimum rate of application is presumed to include consideration of these factors and is represented by the heavy solid line designated by the indicia I in the FIGS. 27, 28, and 29 since the minimum volume of water which may be applied to grow selected crops in a particular type of soil is represented by the lowest point in the curve shown. Hence, at least this minimum volume must be applied to the whole field to be irrigated.

It has been found in practice that volumes of water beyond the capacity of this oil, called field capacity, have many deleterious effects. That is to say, field capacity is that volume of water a given soil will hold before there is drainage through the soil by capillary action or similar movement. For example, the fine soil particles tend to be leached from the soil or carried by drainage water downwardly which causes the more coarse gravelly soil particles to peculiar exposed in the plant root growing zone in sandy type soils to firmly compact clay soils by sedimentation as water flows therethrough, and to drown plants or crops in the oversaturated areas by flooding. In this connection a principal step in the method of irrigating large tracts of land taught by this invention is to cause a multiplicity of mechanical sprinklers to be arranged in a pattern conforming to the optimum profile identified by the indicia I and shown in the plan view of FIG. 25 to be substantially continuously moved across a field to be irrigated and to return to its point of beginning during one cycle of irrigation. In this manner each of the opposite terminal ends of travel are caused to be irrigated with the same volume of water as is the area intermediate those ends in each cycle of operation.

Selection of mechanical irrigation equipment may be made from commonly known charts used in the industry to determine the average volume of water required to saturate selected classified soils, adding to that quantity the average volume of water which may be drawn from the soil by a given crop per acre, and adding to this sum the average volume of water normally evaporated during the various periods of time in a given geographical area as may be obtained from the historical climatic condition records. Suffice it to say here that all water in the soil is not available to growing crops since the plants can not overcome the tendency of the soil to entrap water entirely. Usually equipment is selected to satisfy the maximum or peak demand. At best determinations by this method are arbitrary.

Figure 30:
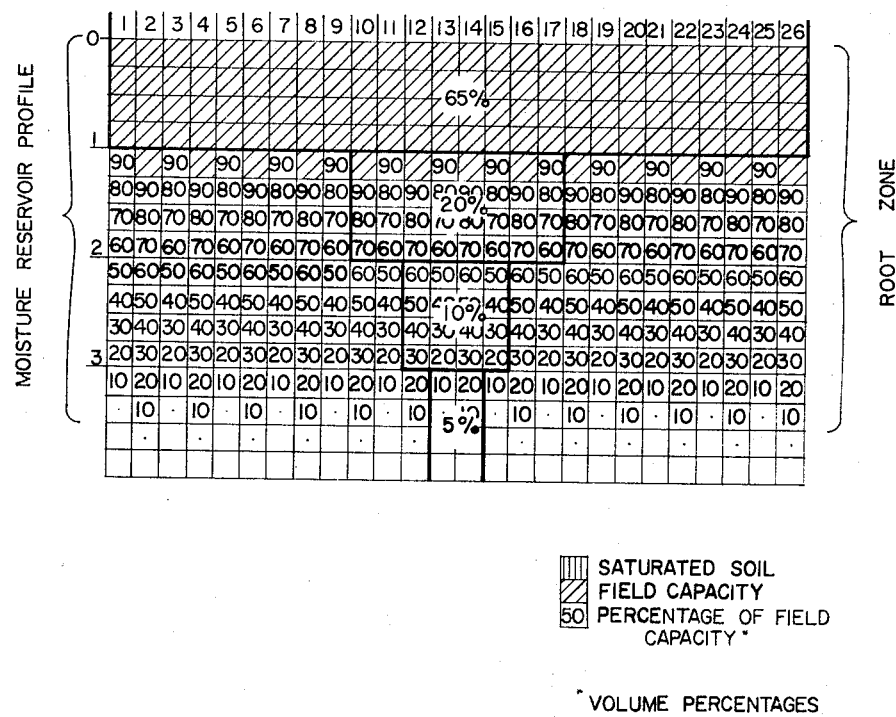
FIG. 30 is a chart illustrating the reservoir capacity of a selected soil sample, the effective rate of withdrawal of a selected plant and the typical flow of water through a selected soil sample at field capacity.

A more accurate method of determining the volume of water required may be found from a further method of this invention. The FIG. 30 is a randomly selected illustration for determining requirements for irrigation of a particular sandy-loam-type soil having particular chemical characteristics adopted and related to the peculiar requirements for the raising of a crop of sugar beets, all of which may be calculated by the steps hereinafter set forth for any of a variety of crops, soil characteristics, chemical orientation and content of a given soil. The actual root zone of the plant is outlined by the heavy solid line border in the drawing and represents the affected crop growing area. The chart as shown in FIGS. 30 also inherently accounts for movement of water through the soil such as by capillary action as well as for the reservoir capacity of the soil as it is related to the crop (sugar demand and the crop ability to withdraw water from the soil over a 26 day period. As shown in the drawing, the plant may optimumly withdraw 65, 20, 10 and 5 percent of the available water in the zones shown outlined. Field rate of a given soil may be calculated and determined by adding water to a soil sample until settlement, sedimentation, or filtration of soil particles is observed. That is to say that field rate equals the ability of a soil to absorb and hold water in the interests therein a quantity of water in a period of time, say 1 minute, without a change to the soil structure in its natural state. Perceptible change in the native soil structure may be readily observed by placing a soil sample in a container and marking on the container a line at the level of the soil. As water is added to the soil settlement of the soil below that line indicates the point at which the soil structure starts to change. Field capacity may be determined and described as that volume of water which may be contained in the interstices by the soil sample, without changing its native structure, and without flowing through the soil by percolation. Saturated soil is all of the volume of water in excess of field rate and field capacity. As shown and indicated by the FIG. 20, the percentage of field capacity is that volume of water which tends to remain in a particular section of the soil sample by inherent tension of soil particles after the accumulation of withdrawal of a given plant demand and evaporation which has been found to directly relate to the ability of a given plant to extract water from the soil moisture reservoir, as hereinafter described. The principal difference between field capacity and saturation is that in field capacity the micropours of the soil structure is full of water while the macropours of the soil are void so as to produce transmutation of the water between the micropours while in saturation, both the micropours and the macropours of the soil structure are full of water. This has been referred to in the art as "aeration irrigation" which in essence is sufficient flow of water through the soil structure without creating the "bridging affect" of water in the structure caused by saturation. Moisture reservoir may be determined by measuring the amount of water in various samples of soil at different periodic intervals by weighing the respective soil sample, baking the sample, and again weighing the sample. The difference in weights thus determined will give the reservoir ability of a given soil. By following the foregoing steps and making determination therefrom, the optimum distribution of the volume of water to be applied to a given field for a given crop may be determined for the optimum quantity or "splash-down rate" which may be selected as illustrated for equipment selection as shown in FIGS. 27, 28, and 29. In addition the optimum frequency of irrigation is established.

Employing the data determined by the steps hereinbefore described, the comparative efficiency of the methods of irrigation is shown to advantage in the FIGS. 31, 32 and 33 in identical soil conditions. The FIG. 31 represents the actual efficiency which may be expected by irrigating by the commonly known flood ditch irrigation method at 11-day intervals. It may be noted that the soil is at and beyond field capacity for each 3-day period following each cycle of irrigation which tends to cause serious change in soil structure and affect in plant life. Any increase in the cyclical rate of irrigation kills the crop by drowning thus indicated a maximum irrigating cycle by this method. In addition, the period of lack of moisture availability above the root zone as shown tends to retard growth in plants.

Although less affect in retardation of plant productive growth is realized in the use of multiplicity mechanical sprinkler systems arranged in parallel rows as hereinbefore described and as represented in the FIG. 32 which is in accordance with set or fixed mechanical sprinkler patterns and periodic move sprinkler patterns shown in FIG. 26 and formerly used in the art, a comparative reservoir pattern may be observed with that of flood-ditch irrigation. In practice it has been found that having determined desirable quantities of water by the method hereinbefore described, and by irrigating cyclically by the method of substantially continuously moving a single row of apparatus across a field to be irrigated, and returning that unit to its point of beginning results in a moisture reservoir pattern as shown to advantage in the FIG. 33 without changing the physical soil structure. It has been found in practice that the economic cost in the labor requirement in using apparatus of the type and character herein earlier described is substantially less than that required in employing the method of each of the examples shown in FIGS. 31, 32, and 33. In practice it has been found in employing the method of cyclical irrigation of this invention that "splash-down rate" on the order of 65 percent of field capacity during each pass of a given cycle produces substantially improved crop results. Although accurate determination of this requirement has not been found, it is reasonably believed that by reason of the time interval between the first and return pass in a given cycle that 15 percent more or less of the actual volume of water applied to a given area is unaccountably dissipated through atmospheric cooling or environmental air-conditioning effects of the system which produce an additional beneficial affect to growing crops which can not otherwise be determined. By this method water is applied to the soil at a rate and for such a time interval as to not bring the soil to a saturated condition. A principal teaching thus expressed is a method of irrigation by which there is nonsaturation of the soil.

Having thus described a preferred embodiment of the invention which embodies the teaching and principles of my invention therefor, it is to be appreciated and will be apparent to those skilled in the art that many physical changes could be made on the invention without altering the inventive concepts embodied therein. Hence, it is intended that the scope of the invention be limited only to the extent indicated by the appended claims.

I claim:

1. In an apparatus for irrigating tracts of land, the combination of a frame; an accumulating reel rotatably supported by said frame; said accumulating reel having a ratchet distally disposed about the periphery of said reel; a crank means axially carried on said frame juxtapositioned adjacent said accumulating reel; said crank means including a pawl engaging said ratchet and being operable to rotatably drive said accumulating reel in response to movement of said crank; reciprocating means carried by said frame and being in operative engagement with said crank; means driving said reciprocating means; a longitudinally extending irrigation conduit in fluid-conducting communication with a remote water source under pressure; means connecting said irrigation conduit to said accumulating reel; a mechanical sprinkler; and means connecting said mechanical sprinkler to said irrigation conduit said reciprocating means comprises a fluid-receiving reservoir pivotally carried on said axle and operatively connected to said crank; and means connecting said water-receiving reservoir to a remote fluid source under pressure; said fluid-receiving reservoir being operable to cause movement of said crank when filled with fluid; discharge means in said fluid-receiving reservoir being operable to discharge water therefrom.

2. The apparatus of claim 1 including means reciprocating said crank when fluid is discharged from said water-receiving reservoir.

3. In an apparatus for irrigating tracts, of land, the combination of a frame; an axlelike conduit carried transversely by said frame; means connecting said axlelike conduit to a remote water source under pressure; an accumulating reel journaled for rotation on said axlelike conduit; said accumulating reel including radially extending conduit means in fluid-conducting communication with said axlelike conduit; a pliable, flexible conduit having one of its terminal ends suitably connected to said radially extending conduit means; said accumulating reel having a ratchet distally disposed about the periphery of said reel; a crank means pivotally carried on said axlelike conduit juxtapositioned adjacent said accumulating reel; said crank means including a pawl engaging said ratchet and being operable to rotatably drive said accumulating reel in response to movement of said crank; reciprocating means carried by said frame being in operative engagement with said crank; means driving said reciprocating means; a transport vehicle suitably connected to said pliable, flexible conduit at the terminal end opposite said radially extending conduit on said accumulating reel; and a mechanical sprinkler in fluid-conducting communication with said flexible, pliable conduit and carried by said transport vehicle.

4. The apparatus as set forth in claim 3 wherein said reciprocating means comprises a diaphragm valve including a housing; a diaphragm disposed in said housing; an operating rod having one of it's terminal ends suitably fastened to one of the faces of said diaphragm and its opposite terminal end connected to said crank; a fluid entranceway in said housing on the side opposite the face of said diaphragm carrying said operating rod; a conduit connecting said fluid entranceway in fluid-conducting communication with a water source under pressure; means in said housing normally urging said diaphragm and said operating rod rearwardly in said housing; said diaphragm being operable to be moved forwardly in response to water under pressure in said housing.

5. The apparatus of claim 4 including means in said conduit selectively connecting said fluid entranceway to a water source under pressure and to a fluid-conducting discharge means.

6. The apparatus of claim 5 including means selectively driving said means in said conduit.

7. The apparatus of claim 6 wherein said means in said conduit includes a water-receiving reservoir; means pivotally mounting said water-receiving reservoir on said frame; an arm portion disposed between said water-receiving reservoir and said pivotal mounting means; a water value disposed below said arm portion; said water valve interconnecting said means connecting said fluid entranceway to a water source under pressure; said water valve including means normally urging said water valve open and operable to permit water to flow therethrough; said diaphragm valve including an outlet portion; means interconnecting said outlet portion of said diaphragm valve in fluid-conducting communication with said water-receiving reservoir; a gate hingedly mounted in the lowermost wall of said reservoir; means connecting said gate to said frame being operable to open said gate in response to pivotal downward movement of said water receiving reservoir when said reservoir is filled with water from said diaphragm valve; said arm portion being operable to close said water valve in response to pivotal downward movement of said water-receiving reservoir when said reservoir is filled with water to restrict the flow of water in means connecting said inlet portion to a water source under pressure.

8. In an apparatus for irrigating tracts of land, the combination of a travelling frame carried by a multiplicity of wheels; an axlelike conduit carried transversely by said frame; means connecting said axlelike conduit to a remote water source under pressure; an accumulating reel journaled for rotation on said axlelike conduit; a multiplicity of parallel spokes suitably fastened to the opposite sides of said accumulating reel, said spokes including a footlike portion extending below said wheels, said accumulating reel including radially extending conduit means in fluid-conducting communication with said axle like conduit; a pliable, flexible conduit having one of its terminal ends suitably connected to said radially extending conduit means; said accumulating reel having a ratchet distally disposed about the periphery of said reel; a crank means pivotally carried on said axlelike conduit juxtapositioned adjacent said accumulating reel; said crank means including a pawl engaging said ratchet and being operable to rotatably drive said accumulating reel and said frame in response to movement of said crank; reciprocating means carried by said frame being in operative engagement with said crank; means driving said reciprocating means, said pliable, flexible conduit being connected at one of its terminal ends to said radial extending conduit on said accumulating reel at its opposite end to a water source under pressure; conducting communication with said reciprocating conduit and carried by said travelling frame.

9. The apparatus of claim 8 wherein said reciprocating means comprises a diaphragm valve including a housing; a diaphragm disposed in said housing; an operating rod having one of it's terminal ends suitably fastened to one of the faces of said diaphragm and its opposite terminal end connected to said crank; a fluid entranceway in said housing on the side opposite the face of said diaphragm carrying said operating rod; a conduit connecting said fluid entranceway in fluid-conducting communication with a water source under pressure; means in said housing normally urging said diaphragm and said operating rod rearwardly in said housing; said diaphragm being operable to be moved forwardly in response to water under pressure in said housing.

10. The apparatus of claim 9 including means in said conduit selectively connecting said fluid entranceway to a water source under pressure and to a fluid-conducting discharge means.

11. The apparatus set forth in claim 10 including means selectively driving said means in said conduit.

12. The apparatus of claim 11 wherein said means in said conduit includes a water-receiving reservoir; means pivotally mounting said water-receiving reservoir on said frame; an arm portion disposed between said water-receiving reservoir and said pivotal mounting means; a water valve disposed below said arm portion; and water valve interconnecting said means connecting said fluid entranceway to a water source under pressure; said water valve including means normally urging said water valve open and operable to permit water to flow therethrough; said diaphragm valve including an outlet portion; means interconnecting said outlet portion of said diaphragm valve in fluid-conducting communication with said water-receiving reservoir; gate hingedly mounted in the lowermost wall of said reservoir means connecting said gate to said frame being operable to open said gate in response to pivotal downward movement of said water-receiving reservoir when said reservoir is filled with water from said diaphragm valve; said arm portion being operable to close said water valve in response to pivotal downward movement of aid water-receiving reservoir when said reservoir is filled with water to restrict the flow of water in means connecting said inlet portion to a water source under pressure.

13. In an apparatus for irrigating tracts of land, the combination of a frame; an axle carried transversely by said frame; an accumulating reel journaled for rotation on said axle; said axle comprising an axlelike conduit means; said accumulating reel having a ratchet distally disposed about the periphery of said reel; a crank means pivotally carried on said axlelike conduit juxtapositioned adjacent said accumulating reel; said crank means including a pawl engaging said ratchet and being operable to rotatably drive said accumulating reel in response to movement of said crank; reciprocating means carried by said frame and being in operative engagement with said crank; means driving said reciprocating means; a cable having one of its terminal ends suitably fastened to said accumulating reel; means interconnecting the opposite terminal end of said cable to a conduit; said conduit being in fluid-conducting communication with a water source under pressure; a multiplicity of transport vehicles suitably connected at intervals along said conduit; and a plurality of mechanical sprinklers in fluid-conducting communication with said conduit and carried by said transport vehicles.

14. The apparatus as set forth in claim 13 wherein said reciprocating means comprises a diaphragm valve including a housing; a diaphragm disposed in said housing; an operating rod having one of it's terminal ends suitably fastened to one of the faces of said diaphragm and its opposite terminal end connected to said crank; a fluid entranceway in said housing on the side opposite the face of said diaphragm carrying said operating rod; a conduit connecting said fluid entranceway in fluid-conducting communication with a water source under pressure; means in said housing normally urging said diaphragm and said operating rod rearwardly in said housing; said diaphragm being operable to be moved forwardly in response to water under pressure in said housing 15. The apparatus of claim 14 including means in said conduit selectively connecting said fluid entranceway to a water source under pressure and to a fluid-conducting discharge means.

16. The apparatus of claim 15 including means selectively driving said means in said conduit.

17. The apparatus of claim 16 wherein said means in said conduit includes a water-receiving reservoir; means pivotally mounting said water-receiving reservoir on said frame; an arm portion disposed between said water-receiving reservoir and said pivotal-mounting means; a water valve disposed below said arm portion; said water valve interconnecting said means connecting said fluid entranceway to a water source under pressure; said water valve including means normally urging said water valve open and operable to permit water to flow therethrough said diaphragm valve including an outlet portion; means interconnecting said outlet portion of said diaphragm valve in fluid-conducting communication with said water-receiving reservoir; a gate hingedly mounted lower most wall of said reservoir means connecting said gate to said frame being operable to open said gate in response to pivotal downward movement of said water-receiving reservoir when said reservoir is filled with water from said diaphragm valve; said arm portion being operable to close said water valve in response to pivotal downward movement of said water-receiving reservoir when said reservoir is filled with water to restrict the flow of water in means connecting said inlet portion to a water source under pressure.

* * * * *